United States Patent Office 3,790,574
Patented Feb. 5, 1974

3,790,574
21-SUBSTITUTED 17-AZA-STEROIDS AND SALTS THEREOF
Zoltán Tuba and Mária Bor, nee Szabó, Budapest, Hungary, assignors to Richter Gedeon Vegyeszeti Gyar R.T., Budapest, Hungary
No Drawing. Filed June 14, 1971, Ser. No. 152,970
Claims priority, application Hungary, June 18, 1970, RI–396
Int. Cl. C07d 51/70
U.S. Cl. 260—268 PC    6 Claims

ABSTRACT OF THE DISCLOSURE

This invention relates to 21-substituted 17-aza-steroids and salts thereof having the Formula I

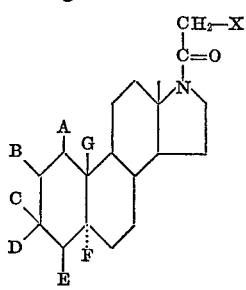

(I)

wherein
A and B each represent hydrogen,
C is hydroxy group, ester or ether,
D, E and F each represent hydrogen atom,
G is a methyl group if the compounds are of androstane type, or
A and B, D and E and F and G each represent termini of double bond, or
C and D represent together an oxo-group, especially a ketal group, and
X represents chlorine, bromine, hydroxy or acyloxy a substituted, secondary or tertiary amino.

---

This invention relates to 21-substituted 17-aza-steroids and salts thereof having the Formula I

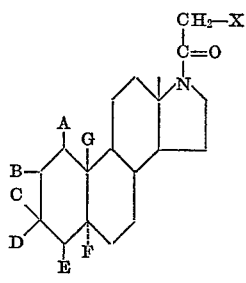

(I)

wherein
A and B each represent hydrogen,
C is a hydroxy group or a protected hydroxy group such as an ester or ether group,
D, E and F each represent hydrogen,
G is a methyl group if the compounds are of androstane type,
A and B, D and E and F and G each represent thermini of a repective double bond, or
C and D represent together an oxo-group or a protected oxo-group, such as a ketal group, and
X represents chlorine, bromine, hydroxy or acyloxy group or a substituted, secondary or tertiary amino group.

The compounds of the invention possess valuable pharmacological properties. Among the compounds of the general Formula I are 3,20-dioxo-21-chloro-17-aza-5α-androstane, 3,20-dioxo-21-hydroxy-17-aza-5α-androstane-21 acetate, 3,20-dioxo-21-hydroxy-17-aza-5α-androstane, 3,20-dioxo-2-hydroxy-17-aza-5α-andstrone - 21 - hemisuccinate, 3β - hydroxy - 20 - oxo-21-chloro-17-aza-5α-androstane, 3β,21 - dihydroxy - 20 - oxo - 17 - aza-5α-androstane-21-acetate and 3β,21-dihydroxy-20-oxo-7-aza-5α-androstane. These compounds possess a catatoxic activity inducing the oxidaze system of mixed function bound to the micrcsomes of liver, of about the same order as spironolactone. These compounds can also be used for the treatment of disorders accompanied by endrogeneous corticoid overproduction, similarly to 1-[2-chlorophenyl-(1)-4-chlorophenyl] - 2,2' - dichloroethane, as well as for the treatment of icterus gr. neonatorum.

21 - pyridinium - 20 - oxo - 17 - aza-estra-1,3,5(10)-triene-3-methylether iodide, 21-triethylamonium-20-oxo-17-aza-estra-1,3,5(10)-triene - 3 - methylether iodide and other compounds of related structure of Formula I possess a curare-like activity less expressed than that of curare.

Compounds of the above type may be generally described by the formula:

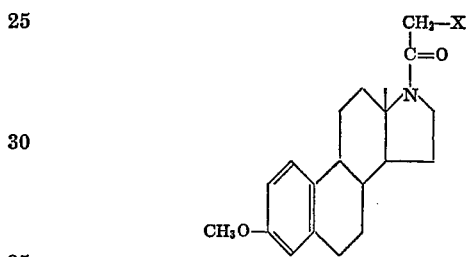

wherein X is chloro, pyridino, triethylamino, N¹-methylpiperazinyl, hydroxyl or acetate and the iodide salts thereof.

21-N-(N'-methyl - piperazinyl) - 20 - oxo - 17 - aza-estra-1,3,5(10)-triene-3-methylether, 3 - ethylene-dioxy-20-oxo-21-N-(N'-methyl - piperazinyl) - 17 - aza - 5α-androstane and other compounds of related structure of Formula I possess bacteriostatic activity in a concentration of 1 to 5 mg./kg. These compounds exert also a serum cholesterol lowering effect on rats when added orally in a dose of 8 to 14 mg./kg. body weight, preferably in a dose of 12 mg./kg. body weight.

Those compounds of the Formula I having an aromatic A-ring do not possess hormonal activities characteristic of estrone derivatives.

According to the invention, compounds are provided which contain a pregnene side chain having a halogen, hydroxy, acyloxy or amino substituent in the 21 position attached to the nitrogen atom in the 17 position. 17-aza-steroides of this type have not been described in the literature.

A further object of the invention is to provide a process for the preparation of the compounds having the formula I.

According to the invention the new 21-substituted-17-aza-steroids of the Formula I are prepared by acylating a compound of the Formula II below—wherein A, B, C, D, E, F, G, AB, DE, FG and CD have the same meanings as stated above—with a compound of the Formula III,

  (III)

wherein X and Y each represent a chlorine or bromine atom, according to the Schotten-Baumann method, and optionally subjecting the thus-obtained 17-aza-20-oxo-21- halo-steroide directly or after the hydrolysis of the ketal-group in the 3 position to a substitution reaction.

The compounds of the Formula II

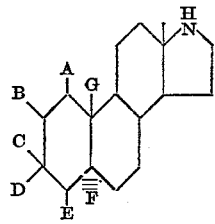

(II)

are prepared from 3 substituted - 16,17-dioxo-6-oximino-5α-androstane or 3 - substituted 16,17-dioxo-16-oximino-estra-1,3,5(10)-triene derivatives (U.S. Pat. No. 3,135,-772, German Pat. No. 875,650) as follows: The starting 16,17-dioxo-16-oximino-androstane or estrane derivative is dissolved in glacial acetic acid at a temperature below the boiling point of the solvent, and a mineral acid, preferably sulfuric acid is added to the homogeneous solution. The reaction mixture is kept for several hours at a temperature of 20 to 100° C. depending on the thermal stability of the corresponding oxime derivative, thereafter the glacial acetic acid solution of the product is added dropwise into water. The separated 16,17-seco-16,17-dicarboxylic acid-5α-androstane or estrane-imide derivative is filtered off, washed and dried.

The above compounds can also be prepared by subjecting the corresponding 16,17 - seco-16-carbamoyl-17-carbomethoxy-androstane or estrane derivatives to ring closure in an alkaline medium.

The 16,17-seco-16,17-dicarboxylic imide obtained in the previous step is dissolved in a polar solvent and methanolic bromine solution or sodium hypochlorite solution, as well as an alkali alkoxide solution, preferably sodium methoxide solution are added simultaneously to the reaction mixture. The reaction mixture is stirred initially at room temperature, and stirring is continued at the boiling point of the solution. After about 30 minutes of stirring the solvent is distilled off, the residue is triturated with water, the product is filtered off, dried and recrystallized. In this step the corresponding 16 - oxo-17-aza-5α-androstane or estrane derivatives are formed. These compounds of lactam structure can also be prepared from the corresponding 16,17 - seco-17-carbamoyl-16-carbomethoxy-5α-androstane or estrane derivatives. According to this latter method the starting substance is dissolved preferably in methanol and treated with lead tetraacetate at the boiling point of the mixture. The lead salts are separated, and the obtained product is converted to the corresponding 16-oxo-17-aza-5α-androstane or estrane derivatives by alkaline hydrolysis.

The above-mentioned 16,17-seco - 16 - carbamoyl-17-carbomethoxy-derivatives can also be converted to the lactam derivatives under the conditions of the Hoffmann-degradation.

The compounds prepared in the second step—i.e. the lactam derivatives—can be converted to the compounds of the general Formula II by reduction with a complex metal hydride. The starting 16-oxo-17-aza-5-androstane or estrane derivative is dissolved in an ether solvent, e.g. in tetrahydrofurane or dioxane, or in an aromatic solvent, e.g. in benzene, or toluene, and is treated with lithium aluminumhydride or with a benzene solution of sodium-bis-2-methoxy-ethoxy-aluminumhydride.

The reaction mixture is preferably boiled for several hours under a nitrogen atmosphere, thereafter the excess of the reducing agent is decomposed by conventional methods, the separated gelatinous precipitate of lithium and aluminum hydroxides is filtered off and thoroughly washed. The combined filtrate and wash is evaporated and the obtained product is crystallized or converted to a mineral salt thereof and the salt is purified.

The preparation of the compounds of the general Formula I is described in more details in the followings.

A compound of the Formula II is suspended or dissolved in an aromatic or halogenated aliphatic solvent—preferably in benzene or dichloromethane—with vigorous stirring, and an alkali hydroxide solution—preferably sodium hydroxide solution—is added to the solution or suspension. The mixture is cooled to 0 to 5° C., and an α-halo-carboxylic halide, preferably chloroacetylchloride is added dropwise to the alkaline mixture with vigorous stirring. After several hours of stirring, the organic phase is separated, washed thoroughly with water, dried, evaporated, and the obtained 17-aza-20-oxo-21-halosteroid derivative is recrystallized if necessary.

The compounds of the general Formula I wherein X is a halogen atom, obtained in the above step, are optionally subjected to substitution reactions.

The compounds of the general Formula I wherein X represents hydroxy or acyloxy group can be prepared as follows: a 17-aza-20-oxo-21-halo-steroid derivative is dissolved in an aliphatic ketone—preferably in acetone—and reacted with an alkali metal carboxylate—preferably with potassium carboxylate—at the boiling point of the mixture. The ester derivatives formed in the above reaction can be hydrolyzed to the corresponding derivatives containing free alcoholic hydroxy group, and these latter compounds can be reacted with carboxylic anhydrides or carboxylic halides to form other esters, e.g. esters formed with higher acids.

The compounds of the Formula I, wherein X represents a secondary or tertiary amino group are prepared as follows: the starting 17-aza-20-oxo-21-halo-steroid derivative is dissolved in an inert solvent (e.g. in an alcohol, ketone, nitrile or ether, preferably in acetone, ethanol, acetonitrile or tetrahydrofurane), and is reacted with an amine, e.g. with dimethylamine, piperidine, triethylamine, pyridine or N-methylpyperazine at room temperature or at the boiling point of the solvent, depending on the nature of the amine reagent. If the end-product separates from the solution, the product is isolated by filtration, while in those cases in which it remains dissolved, the solution is evaporated, the residue is triturated with water, the product is filtered off, dried and crystallized if necessary. The obtained 21-(secondary or tertiary amino)-20-oxo-17-aza-steroids can be converted into their salts according to known techniques.

The invention is elucidated in detail in the following examples. The examples are given for the purpose of illustration and not by way of limitation.

EXAMPLE 1

3-ethylenedioxy-20-oxo-21-chloro-17-aza-5α-androstane 22.5 g. of 3-ethylenedioxy-17-aza-5α-androstane are suspended in 1350 ml. of dichloromethane and 2200 ml. of sodium hydroxide solution are added to the suspension under vigorous stirring. The suspension is cooled to 0° C., and 80 ml. of chloroacetyl chloride are added dropwise to the suspension within about 90 minutes. The mixture is stirred at 0° C. for about additional 30 minutes, thereafter the organic phase is separated and the aqueous layer is extracted with 2×300 ml. of chloroform. The combined organic layers are washed successively with 2 N hydrochloric acid, 3% aqueous sodium hydrocarbonate solution and finally with water. The solution is dried and the solvent is distilled off.

The product is suspended in methanol at 0° C., filtered and dried. 23.5 g. (84%) of 3-ethylene-dioxy-20-oxo-21-chloro-17-aza-5α-androstane are obtained, M.P.: 212–215° C.

*Analysis.*—Calcd. (percent): C, 66.72; H, 8.65; N, 3.53. Found (percent): C, 66.50; H, 8.78; N, 3,64.

EXAMPLE 2

3,20-dioxo-21-chloro-17-aza-5α-androstane 10 g. of 3-ethylenedioxy-2-oxo-21-chloro-17-aza-5α-androstane (prepared as in Example 1) are dissolved in 1000 ml. of peroxide-free tetrahydrofurane and 30 ml. of concentrated hydrochloric acid and 30 ml. of water are added. The solution is left stand for 24 hours at room temperature, thereafter it is adjusted to pH=7. The tetrahydrofurane is distilled off, about 300 ml. of water are added to the residue, the separated precipitate is filtered off, washed thoroughly with water and dried. 8.5 g. (86%) of 3,20-dioxo-21-chloro-17-aza-5α-androstane are obtained, M.P.: 193–195° C. (recrystallized from a mixture of benzene and hexane).

*Analysis.*—Calcd. (percent): C, 68.33; H, 8.60; N, 3.98; Cl, 10.07. Found (percent): C, 68.15; H, 8.48; N, 3.88; Cl, 9.88.

EXAMPLE 3

3,20-dioxo-21-hydroxy-17-aza-5α-androstane-21-acetate 5 g. of 3,20-dioxo-21-chloro-17-aza-5α-androstane are dissolved in 900 ml. of acetone, thereafter 2 g. of lithiumiodide ahd 14.3 g. of potassium acetate dissolved in 104 ml. of water are added to the solution. The reaction mixture is boiled for 9 hours under nitrogen atmosphere and vigorous stirring. Thereafter about 80 percent of the solvent is distilled off the residue is diluted with water, and the separated precipitate is filtered off, washed with water and dried. 5 g. (93%) of 3,20-dioxo-21-hydroxy-17-aza-5α-androstane-21-acetate are obtained, M.P.: 186–189° C. (recrystallized from aqueous methanol).

*Analysis.*—Calcd. (percent): C, 70.37; H, 8.86; N, 3.73. Found (percent): C, 70.60; H, 9.05; N, 3.86.

EXAMPLE 4

3,20-dioxo-21-hydroxy-17-aza-5α-androstane 14 g. of 3,20-dioxo-21-hydroxy-17-aza-5α-androstane-17-acetate (preared as in Example 3) are dissolved in 650 ml. of methanol, and 30.3 ml. of a 21% sodium methoxide solution are added. The mixture is stirred for 2 hours at room temperature under nitrogen atmosphere. Thereafter the mixture is adjusted to pH=7, and methanol is distilled off. The residue is diluted with water, the separated precipitate is filtered off, washed with water and dried. 12 g. (96%) of 3,20-dioxo-21-hydroxy-17-aza-5α-androstane are obtained, M.P.: 210–211° C. (recrystallized from isopropanol).

*Analysis.*—Calcd. (percent): C, 72.03; H, 9.37; N, 4.20. Found (percent): C, 71.87; H, 9.36; N, 4.25.

EXAMPLE 5

3,20-dioxo-21-hydroxy-17-aza-5α-androstane-21-hemisuccinate 5 g. of 3,20-dioxo-21-hydroxy-17-aza-5α-androstane (prepared as in Example 4) are dissolved in 80 ml. of anhydrous pyridine and 5 g. of succinic anhydride are added to the solution. The mixture is left standing at room temperature for 48 hours, thereafter it is poured into ice water. The pH of the solution is adjusted to 2.5 to 3.0, the separated precipitate is filtered off, washed with water and dried. 6 g. (93%) of 3,20-dioxo-21-hydroxy-17-aza-5α-androstane-21-hemisuccinate are obtained, M.P.: 222–223° C. (boiled in acetone).

*Analysis.*—Calcd. (percent): C, 66.49; H, 8.19; N, 3.23. Found (percent): C, 66.53 ;H, 8.27; N, 3.35.

EXAMPLE 6

3,20-dioxo-21-hydroxy-17-aza-5α-androstane-21-hemisuccinate sodium salt 1.04 g. of 3,20-dioxo-21-hydroxy-17-aza-5α-androstane-21-hemisuccinate are dissolved in 60 ml. of ethanol, and 0.197 g. of sodium bicarbonate dissolved in 30 ml. of water are added to the solution under vigorous stirring. The solution is evaporated to dryness in vacuo at a temperature not exceeding 30° C. The residue is washed with anhydrous ethanol and ester. 1 g. (91%) of 3,20-dioxo-21-hydroxy-17-aza-5α-androstane-21-hemisuccinate sodium salt are obtained.

*Analysis.*—Calcd. (percent): C, 63.27; H, 7.52. Found (percent): C, 63.12; H, 7.59.

EXAMPLE 7

3β-hydroxy-20-oxo-21-chloro-17-aza-5α-androstane 3 g. of 3β-hydroxy-17-aza-5α-androstane are reacted as described in Example 1. 3 g. of 3β-hydroxy-20-oxo-21-chloro-17-aza-5α-androstane are obtained, M.P.: 220–222° C. Yield: 79%.

*Analysis.*—Calcd. (percent): C, 67.87; H, 9.11; N, 3.96; Cl, 10.00. Found (percent): C, 67.75; H, 9.20; N, 4.05; Cl, 9.85.

EXAMPLE 8

3β,21-dihydroxy-20-oxo-17-aza-5α-androstane-21-acetate 6.5 g. of 3β-hydroxy-20-oxo-21-chloro-17-aza-5α-androstane are reacted as described in Example 3. 6 g. (93%) of 3β,21-dihydroxy-20-oxo17-aza-5α-androstane-21-acetate are obtained, M.P.: 183–184° C. (recrystallized from a mixture of isopropanol and hexane).

*Analysis.*—Calcd. (percent): C, 69.99; H, 9.35; N, 3.71. Found (percent): C, 69.80; H, 9.40; N, 3.80.

EXAMPLE 9

3,21-dihydroxy-20-oxo-17-aza-5α-androstane 3.7 g. of 3,21-dihydroxy-20-oxo-17-aza-5α-androstane-21-acetate are reacted as described in Example 4. 3 g. (91%), of 3,21-dihydroxy-20-oxo-17-aza-5α-androstane are obtained, M.P.: 227–229° C. (recrystallized from methanol).

*Analysis.*—Calcd. (percent): C, 71.60; H, 9.92; N, 4.18. Found (percent): C, 71.42; H, 9.99; N, 4.25.

EXAMPLE 10

3,20-dioxo-21-hydroxy-17-aza-5α-androstane-21-methane-sulfonate 1 g. of 21-hydroxy-3,20-dioxo-17-aza-5α-androstane are dissolved in 70 ml. of pyridine. The solution is cooled to 0° C. and 2.6 ml. of methanesulfonic acid chloride are added to the solution within about 15 minutes under vigorous stirring. The reaction mixture is stirred for 3 hours at 0° C., thereafter it is dropped into cold (2 to 5° C.) water. The separated precipitate is filtered off, washed successively with 5% hydrochloric acid and water and dried. 1 g. (81%) of 3,20-dioxo-21-hydroxy-17-aza-5α-androstane-21-methanesulfonate are obtained, M.P.: 146–148° C. (recrystallized from methanol).

*Analysis.*—Calcd. (percent): C, 61.36; H, 8.09; N, 3.41; S, 7.80. Found (percent): C, 61.25; H, 8.18; N, 3.46; S, 7.71.

EXAMPLE 11

17-aza-17-N-(α-chloroacetyl)-estra-1,3,5(10)-triene-3-methylether 9.3 g. of 17-aza-estra-1,3,5(10)-triene-3-methylether are reacted as described in Example 1. 9.3 g. (78%) of 17-aza-17-N-(α-chloroacetyl) - estra - 1,3,5(10)-triene-3-methylether are obtained, M.P.: 197–198° C.

*Analysis.*—Calcd. (percent): C, 69.05; H, 7.53; N, 4.03. Found (percent): C, 69.15; H, 7.40; N, 4.12.

EXAMPLE 12

21-pyridinium-20-oxo-17-aza-estra-1,3,5(10)-triene-3-methylether iodide 1 g. of 21-chloro-20-oxo-17-aza-estra-1,3,5(10)-triene-3-methylether are dissolved in 280 ml. of acetone and 1.3 g. of lithiumiodide and 1.7 ml. of pyridine are added to the solution. The reaction mixture is refluxed for 4 hours under introduction of nitrogen. The separated 21-pyridinium-20-oxo - 17 - aza-estra - 1,3,5(10) - triene-3-methyletheriodide is filtered off, washed with acetone and dried. 1.2 g. (91%) of product are obtained, M.P.: 239–240° C.

*Analysis.*—Calcd. (percent): C, 57.93; H, 6.02; N, 5.40; I, 24.49. Found (percent): C, 57.80; H, 6.12; N, 5.35; I, 24.59.

EXAMPLE 13

21-triethylammonium-20-oxo-17-aza-estra-1,3,5(10)-triene-3-methylether-iodide 1 g. of 21 - chloro - 20 - oxo-17-aza-estra-1,3,5(10)-triene-3-methylether are dissolved in 280 ml. of acetone and 1.3 g. of lithiumiodide and 2.5 ml. of triethylamine are added to the solution. The reaction mixture is boiled for 4 hours under nitrogen atmosphere. The separated substance is filtered off, washed with acetone and dried. 1.3 g. (86%) of 21 - triethylammonium - 20 - oxo-17-aza-estra-1,3,5(10)-triene - 3 - methylether iodide are obtained, M.P.: 214–216° C. (recrystallized from ethanol).

*Analysis.*—Calcd. (percent): C, 57.77; H, 7.65; N, 5.18; I, 23.47. Found (percent): C, 57.77; H, 7.80; N, 5.23; I, 23.47.

EXAMPLE 14

21-iodo-20-oxo-17-aza-estra-1,3,5(10)-triene-3-methylether 3 g. of 21 - chloro - 20 - oxo - 17-aza-estra-1,3,5(10)-triene-3-methylether are dissolved in 600 ml. of acetone and 4 g. of sodium iodide are added to the solution. The reaction mixture is boiled for 30 minutes under nitrogen atmosphere, the separated sodium chloride is filtered off and the filtrate is evaporated in vacuo. The residue is suspended in water, the separated 21 - iodo - 20-oxo-17-aza-estra-1,3,5(10)-triene - 3 - methylether is filtered off and dried. 3.7 g. (97.5%) of the product are obtained, M.P.: 180–182° C.

*Analysis.*—Calcd. (percent): C, 54.68; H, 5.89; N, 3.15; I, 28.55. Found (percent): C, 54.50; H, 5.99; N, 3.23; I, 28.62.

EXAMPLE 15

21-hydroxy-20-oxo-17-aza-estra-1,3,5(10)-triene-3-methylether-21-acetate 7.7 g. of 21 - chloro - 20-oxo-17-aza-estra-1,3,5(10)-triene-3-methylether are reacted as described in Example 3. 8 g. (94%) of 21 - hydroxy - 20 - oxo-17-aza-estra-1,3,5(10) - triene - 3 - methylether-21-acetate are obtained, M.P.: 172–174° C. (recrystallized from methanol).

*Analysis.*—Calcd. (percent): C, 71.14; H, 7.87; N, 3.77. Found (percent): C, 71.18; H, 7.95; N, 3.85.

EXAMPLE 16

21-N-(N'-methylpiperazinyl)-20-oxo-17-aza-estra-1,3,5(10)-triene-3-methylether 1 g. of 2 1 chloro - 20 - oxo - 17 - aza-estra-1,3,5(10)-triene-3-methylether are dissolved in the mixture of 7.6 ml. of benzene and 88 ml. of acetonitrile, and 0.3 g. of N-methylpiperazine and 0.015 g. of sodium iodide are added. The reaction mixture is maintained at 60° C. for 4 hours under nitrogen atmosphere. Thereafter the solvent is distilled off, the residue is triturated with water, the separated precipitate is filtered off, washed thoroughly with water and dried. The obtained steroid base, melting at 155–157° C. is dissolved in ethanol and the corresponding dihydrochloride is precipitated with ethanolic hydrochloric acid. The product is recrystallized from a mixture of methanol and acetone. 1.3 g. (93%) of 21-N-(N'-methylpiperazinyl)-20-oxo-17-aza-estra - 1,2,3,5(10) - triene-3-methylether-dihydrochloride are obtained, M.P.: 170–172° C.

*Analysis.*—Calcd. (percent): C, 72.93; H, 9.06; N, 10.21. Found (percent): C, 73.00; H, 9.00; N, 10.25.

EXAMPLE 17

3-ethylenedioxy-20-oxo-21-N-(N'-methylpiperazynil)-17-aza-5α-androstane 0.88 g. of 21 - chloro - 20 - oxo - 17 - aza-5α-androstane-3-ethyleneketal are reacted as described in Example 16. 1 g. (97%) of 3 - ethylenedioxy - 20-oxo-21-N-(N'-methylpiperazinyl)-17-aza - 5α - androstane-dihydrochloride are obtained, M.P.: 242–244° C. (recrystallized from methanol).

*Analysis.*—Calcd. (percent): C, 70.56; H, 9.86; N, 9.14. Found (percent): C, 70.40; H, 9.86; N, 9.25.

EXAMPLE 18

21-(N'-methylpiperazino)-20-oxo-17-aza-estra-1,3,5(10)-triene-3-methylether 2 g. of 21 - chloro - 20 - 17-aza-estra-1,3,5(10)-triene-3-methylether are dissolved in a mixture of 150 ml. of benzene and 170 ml. of acetonitrile, and 6 g. of N-methylpiperazine are added. The reaction mixture is maintained at 70° C. for 6.5 hours, the solvent is distilled off, the residue is triturated with water, the separated substance is filtered off, washed thoroughly with water and dried. The obtained steroid base melting at 155–157° C. is dissolved in ethanol and reacted with ethanolic hydrochloric acid. The separated substance is crystallized from a mixture of methanol and acetone. 2.2 g. (78%) of 21-(N'-methylpiperazino) - 20 - oxo - 17 - aza - estra-1,3,5(10)-triene - 3 - methylether - dihydrochloride are obtained. M.P.: 169–171° C.

*Analysis.*—Calcd. (percent): C, 72.93; H, 9.06; N, 10.21. Found (percent): C, 72.58; H, 8.91; N, 10.00.

What we claim is:

1. A compound having the formula:

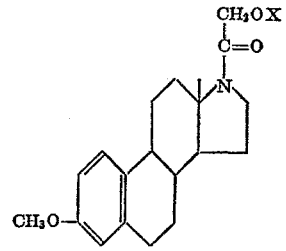

wherein X is hydroxyl, chloro, acetate, pyridino, triethylamino, or $N^1$-methylpiperazinyl, or the iodide salt thereof.

2. The compound defined in claim 1 and consisting of 21-chloro-20-oxo-17-aza-estra-1,3,5(10) - triene - 3 - methylether.

3. The compound defined in claim 1 consisting of 21-pyridino - 20 - oxo-17-aza-estra-1,3,5(10)-triene-3-methylether-iodide.

4. The compound defined in claim 1 and consisting of 21 - triethylammonium-20-oxo-17-aza-estra-1,3,5(10)-triene-3-methylether iodide.

5. The compound defined in claim 1 and consisting of 21 - hydroxy-20-oxo-17-aza-estra-1,3,5(10)-triene-3-methylether-21-acetate.

6. The compound defined in claim 1 and consisting of 21 - N - (N'-methylpiperazino)-20-oxo-17-aza-estra-1,3,5-(10)-triene-3-methylether.

(References on following page)

References Cited

UNITED STATES PATENTS

| | | | |
|---|---|---|---|
| 3,153,645 | 10/1964 | Ayer | 260—268 PC |
| 3,180,864 | 4/1965 | Wendt | 260—268 PL |
| 3,523,942 | 8/1970 | Holden | 260—239.8 |
| 3,634,419 | 1/1972 | Nelson | 260—326.5 B |

OTHER REFERENCES

Gut et al., Chem. Abstr., vol. 60, col. 12078d (1964).

Rakhit et al., Chem. Abstr., vol. 61, col. 16118b (1964).

V. Nelson et al., Chem. Abstr., vol. 76, col. 99925j, U.S. Pat. 3,634,419.

Tuba et al., Chem. Abstr., vol. 76, col. 99920d (1972), Abstracting German 2, 130, 282.

Tuba et al., Chem. Abstr., vol. 76, col. 99132d (1972), Abstracting German 2, 130, 323.

DONALD G. DAUS, Primary Examiner

U.S. Cl. X.R.

260—293.55, 295 A, 326.5 B; 424—250, 263, 267, 274